United States Patent
Gaida et al.

(10) Patent No.: US 7,430,317 B2
(45) Date of Patent: Sep. 30, 2008

(54) COLOURING OF DIGITAL TEXT ELEMENTS AND/OR PICTURE ELEMENTS

(76) Inventors: Klemens Gaida, Zum Wald 21, 46519 Alpen (DE); Marco Iannacone, Via Turan, 8, 20090 Segrate (IT)

( * ) Notice: Subject to any disclaimer, the term of this patent is extended or adjusted under 35 U.S.C. 154(b) by 50 days.

(21) Appl. No.: 11/117,741

(22) Filed: Apr. 22, 2005

(65) Prior Publication Data
US 2006/0033748 A1 Feb. 16, 2006

(51) Int. Cl.
*G06K 9/00* (2006.01)
(52) U.S. Cl. .................................................. 382/162
(58) Field of Classification Search ................ 382/162
See application file for complete search history.

(56) References Cited

U.S. PATENT DOCUMENTS

| | | | |
|---|---|---|---|
| 4,857,955 A * | 8/1989 | Crandall | 358/1.9 |
| 4,862,256 A * | 8/1989 | Markle et al. | 348/34 |
| 5,093,717 A * | 3/1992 | Sandrew | 348/34 |
| 5,508,718 A * | 4/1996 | Haikin | 345/601 |
| 5,615,320 A * | 3/1997 | Lavendel | 345/594 |
| 5,649,024 A * | 7/1997 | Goldsmith | 382/170 |
| 5,999,650 A * | 12/1999 | Ligon | 382/191 |
| 6,353,483 B1 * | 3/2002 | Laverty et al. | 358/1.15 |
| 6,366,302 B1 | 4/2002 | Crosby et al. | |
| 6,381,027 B1 * | 4/2002 | Tanaka | 358/1.11 |
| 7,110,147 B1 * | 9/2006 | Hayama et al. | 358/464 |

FOREIGN PATENT DOCUMENTS

| | | |
|---|---|---|
| EP | 1 255 418 A3 | 9/2003 |
| JP | 2000324526 | 5/1999 |
| JP | 2001111675 | 8/1999 |

* cited by examiner

*Primary Examiner*—Bhavesh Mehta
*Assistant Examiner*—Yuzhen Ge
(74) *Attorney, Agent, or Firm*—Lawrence G. Fridman

(57) ABSTRACT

The invention relates to a method and a device for displaying, in color, digital text elements and/or picture elements on a digital color display, the text elements and/or picture elements having no color information of their own, a color generator allotting, in each case, a color from a color palette to each of the text elements and/or picture elements.

9 Claims, 2 Drawing Sheets

COLOURING OF DIGITAL TEXT ELEMENTS AND/OR PICTURE ELEMENTS

FIELD OF THE INVENTION

The invention relates to a method of displaying, in color, digital text elements and/or picture elements on a digital colored display, the text elements and/or picture elements having no color information of their own. Furthermore, the invention relates to a device for displaying digital text elements and/or picture elements on a digital color display, wherein the text elements and/or picture elements have no color information of their own.

BACKGROUND OF THE INVENTION

Often, black-and-white pictures, films or text are colored, in order to make them appear more genuine. Films are simply pictures which are attached to one another. Films originally shot in black-and-white are meanwhile shown in color. To this end, they are colored expensively. Formerly, these pictures were manually dyed individually, i.e, picture-by-picture. For cost reasons, this method of coloring pictures or films is no longer cost-effective.

Nowadays, black-and-white pictures or texts are scanned by means of scanners. The black-and-white pictures are then subsequently available in digital form in the memory of a computer. Digital data is more easily processed. With appropriate programs, color information can be allotted to the digital pictures by means of the computer. This assigning of color information is, however, continued to be effected largely manually, as, from the pictures alone, it cannot be ascertained, which color are to be assigned to the individual objects. There is no color information in the pictures. At best, grey-tones of black-and-white pictures serve as a criterion for the color selection. By the grey-tones one can, for example, determine whether a color is slightly stronger or slightly paler. With the coloring of pictures, colors are to be substantially in conformity with reality.

Often, it is completely unimportant which color is allotted to a picture or text. It is only important that the picture or the text has a colorful appearance. The colors of the optical reality play a secondary role.

SUMMARY OF THE INVENTION

Therefore, it is the object of the invention to provide a method and a device for a digital color display, wherein the black or grey text elements or picture elements, respectively, which have no color information of their own, are automatically displayed in color.

According to the invention, this object is achieved in that, with a method of the type mentioned in the beginning, a color generator allocates a color out of a color palette to each of the text elements and/or picture elements.

Further advantages result from the subject matter of the sub-claims.

DESCRIPTION OF PREFERRED EMBODIMENT

Figure 1:
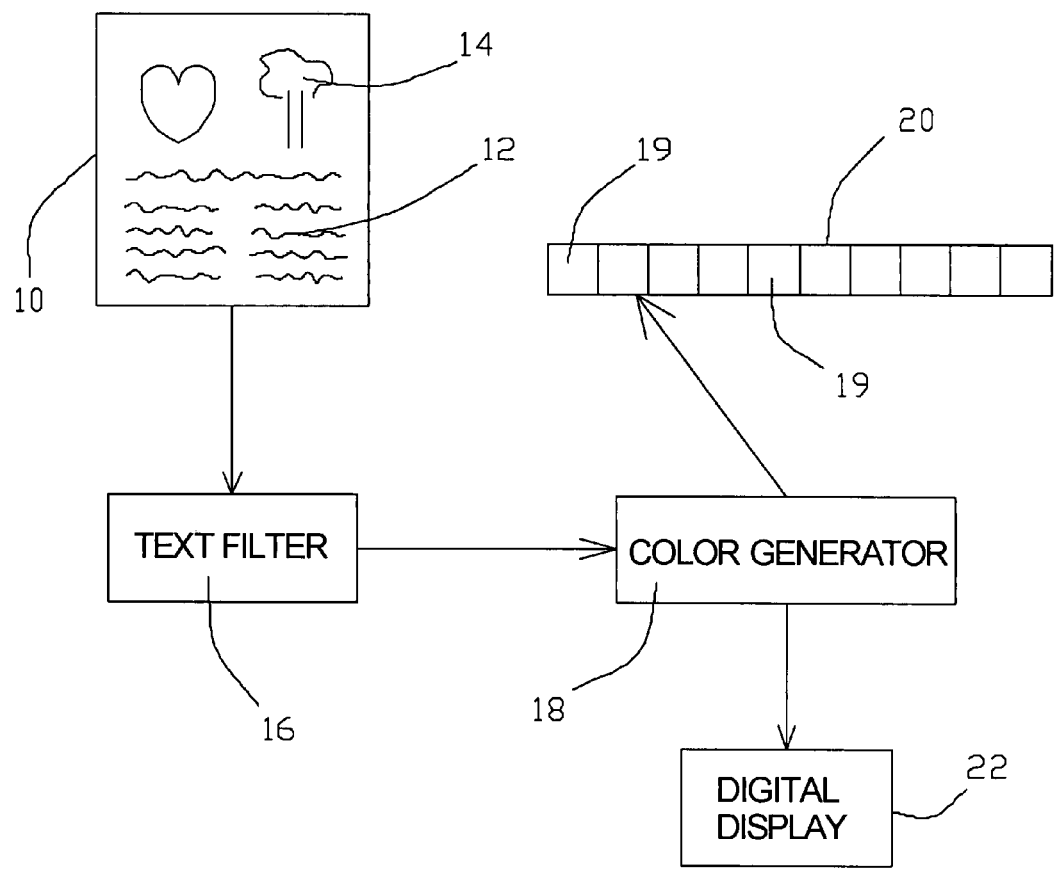
FIG. 1 is a principle sketch and shows a first embodiment of a device and a method for displaying, in color, digital black-and-white text elements and picture elements.

The present invention provides a device for displaying digital text elements and/or picture elements on a digital color display, wherein a color generator is provided, which allocates, in each case, a color from a color palette to each of the text elements and/or picture elements.

The invention is based on the principle of simply allocating a color to each text or picture element. This may be an optional color, or a color defined beforehand. The aim of the invention is to color originally black-and-white displays and to represent them on an appropriate display device.

Grey components of pictures or texts are also black-and-white, as a grey area is composed of black and white spots. The larger the percentage of the white spots is, the brighter appears the grey tone. The darker the grey tone appears, the more black spots are present on the grey area as compared to the white spots.

It has proved to be an advantageous modification of the method of the invention, if a text filter detects certain terms from the text and causes the color generator to allocate to them a color fixed beforehand or a fixed color range. For example, the terms "love" and "heart" can be associated with the color red; whereas the term "forest" and "meadow" will more likely be associated with green.

A further advantageous modification of the method is achieved, in that a text filter filters out certain terms from the text and causes the color generator to allocate a color fixed beforehand or a fixed color range to the background of the display of this term. If, for example, the term "sea" or "cold" appears in the text, the background can be colored with a deep blue, the color with which men associate water and cold. Blurred color transitions may be generated.

To allocate any arbitrary color to the text element or picture element, advantageously a random generator is suited, which allocates the colors or color ranges to the "black-and-white" or grey, respectively, text elements and/or picture elements.

Advantageously, the colors or color ranges may be weighted. By this measure, it is possible to regulate whether, for example, if particular bright and joyful colors are used as compared to dark and sad colors.

With text elements and/or picture elements which have grey tones, advantageously the color generator allots colors of a color palette corresponding to the grey tones.

A further advantageous aspect of the method of the invention consists in that the color generator selects for the picture elements a coloring, which, in each case, is in conformity with the contents of the picture, and allocates this coloring to the respective picture element. Thus, for example, a forest and a meadow can be digitally colored with the colorings "green" or a heart with "red". In order to simplify this procedure, the picture elements have identifying text information, not visible in the color display, which permits ascertaining what the picture elements represent.

An appropriate modification of the method of the invention is obtained in that the color display is provided as a component of a mobile station. In this way, the color presentation in mobile stations can be influenced. Black-and-white contents are now displayed in a mobile station in color.

In order not to stress the resources of a small dimensioned mobile station excessively, according to an advantageous modification of the method, the allocating of colors may be carried out by a centrally controlled color generator.

A particularly advantageous modification of the device of the invention consists in that a color generator is provided, which allots, in each case, a color from a color palette to each of the text elements and/or picture elements.

A further advantage results if a text filter detects certain terms from the text and causes the color generator to allot to them a color fixed beforehand or a fixed color range.

An advantageous modification of the device of the invention is obtained in that a text filter is provided, which filters out certain terms from the text and causes the color generator to allocate a color fixed beforehand or a fixed color range to the background of the display of the term. Thereby, different backgrounds can be generated.

A further advantageous modification of the invention consists of using a random generator which selects the colors or color ranges which are allocated totally or partly to the text elements or picture elements. In order to display preferred colors more often on the digital display than undesired colors, the colors or color ranges are preferably weighted.

A further advantageous aspect of the invention is that a color generator allocates to those text elements and/or picture elements which have grey tones, color of a color palette, corresponding to grey tones.

In a further modification of the device of the invention, the color generator selects for the picture elements a coloring corresponding, in each case, to the picture. In this way, it is possible, for example, to display the sky and the sea in blue. This display can be realized more easily, if the picture elements have identifying text information, not visible in the color display, which permits ascertaining what the picture elements represent.

In a preferred embodiment of the invention, the color display is provided as a component of a mobile station.

In order to save capacity on the display unit, an advantageous modification of the invention is a centrally controlled color generator which processes color allocation.

It has been found useful, if the color is selected such that a sufficient contrast and a sufficient brightness is always ensured. Therefore, appropriate means are provided which cause the color generator to select only such colors that a sufficient contrast and sufficient brightness on the digital display is present. Thereby the eye of the observer can more easily perceive the information of the display.

Referring to FIG. 1, a first embodiment of a device and method for displaying digital black-and-white text elements or picture elements is illustrated in the form of a principle sketch. Numeral 10 designates a digital, black-and-white image. This digital image 10 contains text elements 12 and picture elements 14. In the technological realization, the text elements 12 and picture elements 14 are available in a digital memory matrix, which is read out by a picture generator. The memory matrix and the picture generator are not shown in this figure.

The digital and black-and-white image 10 is supplied to a text filter 16. The text filter 16 analyses the digital text 12 and causes a color generator 18 to allocate pre-defined colors 19 to individual terms. To this end, the colors 19 are selected by the color generator from a color palette 20. Subsequently, the digital image 10, to which now the colors of the color palette is allocated, is displayed, in color, on the digital display 22. Therefore, the digital display 22 has to be able to display colored representations.

Figure 2:
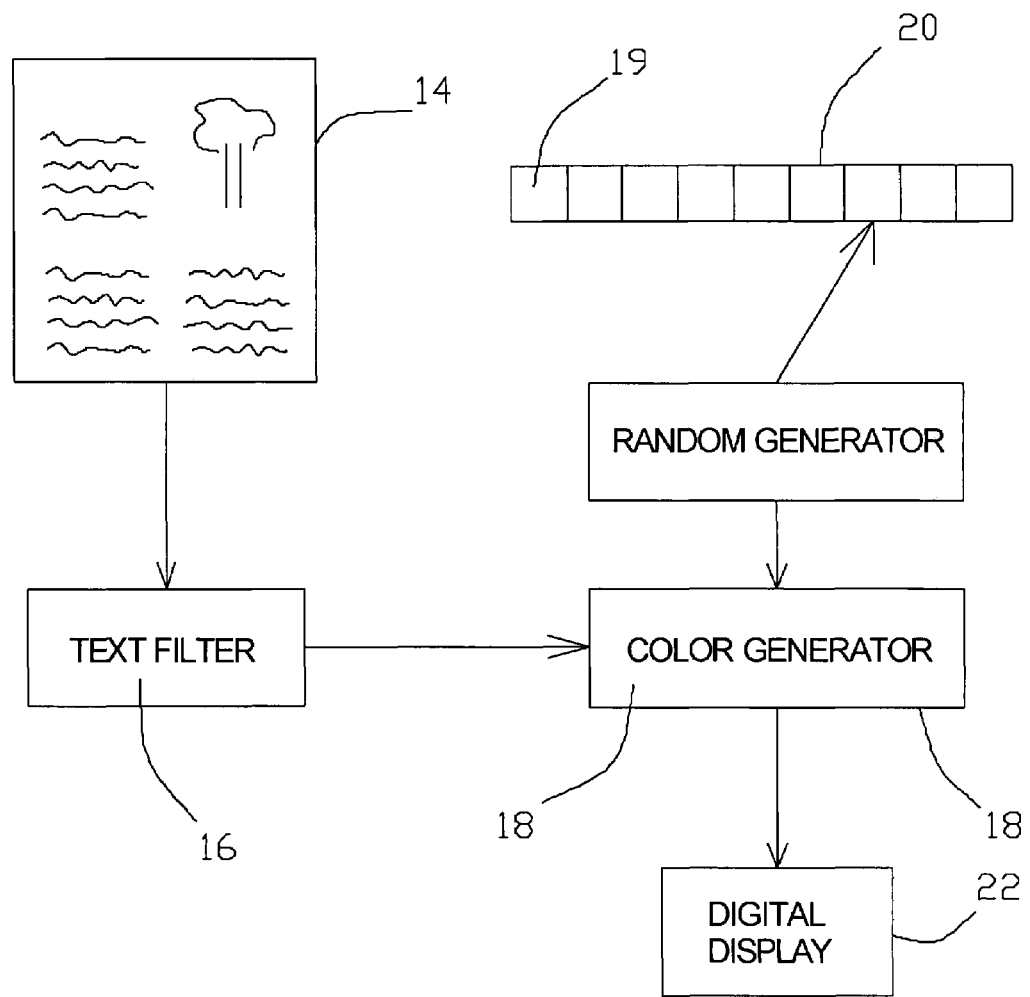
FIG. 2 is a principle sketch and shows a second embodiment with a random generator for a device for a method of displaying, in color, digital black-and-white text elements or picture elements.

FIG. 2 shows a second embodiment with random generator of a device and a method for display, in color, of digital black-and-white text elements and picture elements. Numeral 10, again, designates the digital, "black-and-white" image. This digital image 10 contains text elements 12 and picture elements 14. In the technological realization, the text elements 12 and the picture elements 14 are stored, as in the preceding embodiment, in a digital memory, which is read out by a picture generator.

The digital and black-and-white image 10 is supplied to a text filter 16. The text filter 16 analyses the digital text 12 and causes the color generator 18 to associate individual terms with predetermined colors. To this end, the colors 19 are selected by the color generator 18 from a color palette 20. The selection is made through a random generator 24. This ensures that the text 12 gets any arbitrary colors. Provisions can, however, be made that also with the random generator 24 certain colors 19 of the color palette 20 are excluded.

As soon as a random color has been allotted to the text 12 or the picture element by the color generator 18, the text and the picture elements are outputted on the digital color display 22.

In this way, by the method described above, now colors can be allocated to pictures or texts, which have no color information at all, in accordance with certain criteria or at random. While, before, the black-and-white or grey pictures or texts have been colored manually, these pictures or texts can now automatically be displayed in color. This permits a colorful display.

The invention claimed is:

1. A method of displaying digital text elements and picture elements of an image with objects in color on a digital color display, said method comprising the steps of:
   detecting predetermined text expressions from text elements utilizing a text filter;
   analyzing and determining a meaning of said text expressions;
   detecting picture elements having identifying text information provided to ascertain the subject matter of said picture elements, said identifying text information identifies a predetermined object in picture elements of the image;
   analyzing and determining a meaning of said identifying text information;
   allocating a predetermined color from a color palette to said predetermined text expressions by a color generator, so that said text expressions are being colored on digital color display corresponding to a subject matter of said text expressions; and,
   allocating a predetermined color from the color palette to said predetermined object in said picture elements by the color generator, so that said predetermined object is being colored on said digital color display based on the meaning of said identifying text information identifying said predetermined object.

2. A method according to claim 1, wherein said digital color display is provided as a component of a mobile station.

3. A method according to claim 1, wherein said allocation of at least one predetermined color is carried out by a centrally controlled color generator.

4. A method according to claim 1, wherein individual colors can be excluded from said display.

5. A method according to claim 1, wherein a predetermined color is being allocated by the color generator to a background of the display of said predetermined text expressions, so that the background of said text expressions is being colored on said digital color display corresponding to a subject matter of said text expressions.

6. A method of claim 1, wherein said predetermined color allocated to said text expressions is selected by a random generator.

7. A method according to claim 6, wherein said predetermined color comprises a range of colors evaluated in such a manner that colors within a specified subset of said color palette are chosen more frequently.

8. A method according to claim 7, wherein said range of colors comprises grey tones, said grey tones are allocated to said textual expressions by the color generator.

9. A method according to claim 1, wherein said picture elements have identifying text information not displayed in the digital picture in the color display.

* * * * *